United States Patent
Li et al.

(10) Patent No.: US 10,492,236 B2
(45) Date of Patent: Nov. 26, 2019

(54) METHOD AND DEVICE FOR ESTABLISHING WIRELESS CONNECTION

(71) Applicant: SHANGHAI LIANSHANG NETWORK TECHNOLOGY CO., LTD., Shanghai (CN)

(72) Inventors: Haiyang Li, Shanghai (CN); Huajia Zhang, Shanghai (CN)

(*) Notice: Subject to any disclaimer, the term of this patent is extended or adjusted under 35 U.S.C. 154(b) by 0 days.

(21) Appl. No.: 15/965,850

(22) Filed: Apr. 28, 2018

(65) Prior Publication Data

US 2018/0249515 A1     Aug. 30, 2018

Related U.S. Application Data

(63) Continuation of application No. PCT/CN2016/070684, filed on Jan. 12, 2016.

(30) Foreign Application Priority Data

Oct. 29, 2015 (CN) .......................... 2015 1 0724349

(51) Int. Cl.
*H04W 76/10* (2018.01)
*G06K 7/14* (2006.01)
*H04W 48/16* (2009.01)

(52) U.S. Cl.
CPC .......... *H04W 76/10* (2018.02); *G06K 7/1417* (2013.01); *H04W 48/16* (2013.01)

(58) Field of Classification Search
CPC ............ G06F 17/218; G06K 19/06037; G06K 7/1417
See application file for complete search history.

(56) References Cited

U.S. PATENT DOCUMENTS

| | | | | |
|---|---|---|---|---|
| 9,742,997 | B1* | 8/2017 | Bamberger | H04N 5/23241 |
| 10,158,723 | B2* | 12/2018 | Miyazaki | G06F 13/00 |
| 10,169,626 | B2* | 1/2019 | Britt | G06K 7/10386 |
| 2017/0011015 | A1* | 1/2017 | Dakua | G06F 17/278 |
| 2018/0032997 | A1* | 2/2018 | Gordon | G06Q 20/3224 |

FOREIGN PATENT DOCUMENTS

| | | |
|---|---|---|
| CN | 102724668 A | 10/2012 |
| CN | 102802155 A | 11/2012 |
| CN | 103124331 A | 5/2013 |
| CN | 104135753 A | 5/2014 |

* cited by examiner

*Primary Examiner* — Ayaz R Sheikh
*Assistant Examiner* — Debebe A Asefa
(74) *Attorney, Agent, or Firm* — Kilpatrick Townsend & Stockton, LLP

(57) ABSTRACT

A method and device for establishing a wireless connection is provided. The method includes parsing target two-dimensional code information associated with a target wireless access point to acquire access-related information of the target wireless access point, and establishing a wireless connection between first user equipment and the target wireless access point on the basis of the access-related information. A wireless connection with a wireless access point on the basis of access-related information of a target wireless access point acquired by parsing target two-dimensional code information of the target wireless access point. A user of first user equipment can acquire high-quality access-related information of a target wireless access point even in a situation in which the access-related information of the target wireless access point is unknown to the user.

12 Claims, 6 Drawing Sheets

METHOD AND DEVICE FOR ESTABLISHING WIRELESS CONNECTION

CROSS-REFERENCES TO RELATED APPLICATIONS

This application is a continuation of International Application No. PCT/CN2016/070684, filed on Jan. 12, 2016, which claims priority to Chinese Patent Application No. 201510724349.4, filed on Oct. 29, 2015. The disclosures of the aforementioned applications are hereby incorporated by reference in their entireties.

FIELD OF THE INVENTION

The present application relates to the field of computers, and in particular to a technology for establishing a wireless connection.

BACKGROUND OF THE INVENTION

In the prior art, when a user equipment needs to access a wireless network, for example, when the user equipment needs to connect to a wireless fidelity (WiFi) network, a user generally selects a wireless access point directly based on information about a wireless access point list displayed on the user equipment. However, when there are a larger number of wireless access points in the wireless access point list, the user may not quickly determine a wireless access point having a high success rate.

In addition, in the prior art, even if a plurality of user equipments are within the coverage area of one wireless access point at the same time and the plurality of user equipments attempt to connect to the wireless access point, the results of the connection attempts may be different due to factors such as different wireless network connection statuses and differences between user equipments. For example, for two mobile devices within the coverage area of one wireless access point, one of the mobile devices successfully acquires password information about the wireless access point and connects to the wireless access point, but the other mobile device may not establish a connection to the wireless access point due to reasons such as failure in acquiring the password information, affecting user experience.

In addition, in the prior art, when a user equipment needs to acquire information such as an access password of an access point from another equipment, the user equipment generally relies on an existing network to perform data transmission, consuming traffic resources of the user.

BRIEF SUMMARY OF THE INVENTION

An objective of the present application is to provide a method and device for establishing a wireless connection.

According to an aspect of the present application, a method for establishing a wireless connection at a first user equipment end is provided, which comprises:

parsing target QR code information regarding a target wireless access point to obtain access related information about the target wireless access point; and establishing a wireless connection between a first user equipment and the target wireless access point based on the access related information.

According to another aspect of the present application, a method for establishing a wireless connection at a second user equipment end is also provided, which comprises:

generating QR code information regarding a wireless access point based on access related information about the wireless access point.

According to still another aspect of the present application, a first user equipment for establishing a wireless connection is also provided, which comprises:

a first means for parsing target QR code information regarding a target wireless access point to obtain access related information about the target wireless access point; and a second means for establishing a wireless connection between the first user equipment and the target wireless access point based on the access related information.

According to yet another aspect of the present application, a second user equipment for establishing a wireless connection is also provided, which comprises:

a fourth means for generating QR code information regarding a wireless access point based on access related information about the wireless access point.

According to a further aspect of the present application, a system for establishing a wireless connection is also provided, which comprises: the first user equipment for establishing a wireless connection according to the still another aspect of the present application and the second user equipment for establishing a wireless connection according to the yet another aspect of the present application.

Compared with the prior art, the present application parses the target QR code information regarding the target wireless access point to obtain the access related information about the target wireless access point, and establishes a wireless connection with the wireless access point, so that even if a corresponding user does not know the access related information about the target wireless access point or the first user equipment 1 may not successfully obtain the access related information from a corresponding server, the first user equipment 1 can quickly obtain access related information about a desirable target wireless access point, thereby meeting the wireless connection requirement of the first user equipment 1. In addition, the present application does not require the first user equipment to select a wireless access point from a long wireless access point list displayed thereon and acquire the corresponding access related information, but instead, directly implements wireless connection based on the access related information corresponding to the target wireless access point, thereby simplify corresponding operations and optimizing user experience. Here, the target wireless access point may be a wireless access point that another user equipment has successfully connected to or may be a wireless access point having a high connection success rate, so that the success rate of wireless connection of the first user equipment based on the target wireless access point can be ensured.

Further, the first user equipment can acquire, by scanning the target QR code, the access related information about the corresponding target wireless access point from the second user equipment, for example, connection password information. In this way, if the first user equipment may not successfully connect to the target wireless access point due to factors such as different wireless network connection statuses and differences between user equipments, the first user equipment can directly acquire the access related information about the target wireless access point from the neighbouring second user equipment. Because scanning the QR code does not need to consume traffic resources, the first user equipment can acquire the QR code information even if it has not connected to a network, thereby saving traffic resources of the first user equipment.

Further, the target QR code information regarding the target wireless access point may be attached to corresponding picture information, so that based on transmission of the picture information, the first user equipment can acquire the QR code information regarding the target wireless access point from another neighbouring user equipment or from another user equipment which is not neighbouring to the first user equipment but has the access related information about the target wireless access point that can match the first user equipment. Whereby, the first user equipment can efficiently implement corresponding wireless connection based on the target wireless access point having a high connection success rate.

Further, the second user equipment, when acquiring access related information about a wireless access point having a high connection success rate, can generate QR code information regarding the wireless access point based on the acquired access related information, and provide the QR code information to the first user equipment that may also match the wireless access point, so that the first user equipment can implement the wireless connection based on the access related information corresponding to the determined target QR code information having a high connection success rate. Meanwhile, the access related information stored in the first user equipment is reused. Therefore, the overall resource utilization rate is improved.

BRIEF DESCRIPTION OF THE DRAWINGS

By reading the following detailed description made with reference to the drawings for non-limiting embodiments, the other features, objectives and advantages of the present application will become more apparent.

Figure 1:
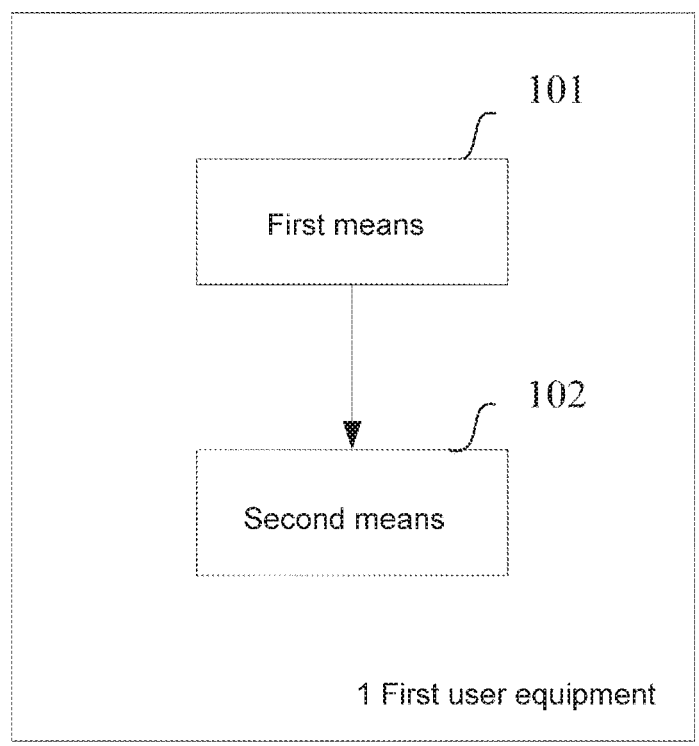
FIG. 1 shows a schematic diagram of a first user equipment for establishing a wireless connection according to one aspect of the present application.

In the drawings, the same or similar reference signs represent the same or similar components.

DETAILED DESCRIPTION OF THE INVENTION

The present application is hereinafter further described in detail with reference to the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. The memory is an example of a computer-readable medium.

The computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

FIG. 1 shows a schematic diagram of a first user equipment 1 for establishing a wireless connection according to one aspect of the present application. The first user equipment 1 includes a first means 101 and a second means 102.

The first means 101 parses target QR code information regarding a target wireless access point to obtain access related information about the target wireless access point; and the second means 102 establishes a wireless connection between the first user equipment 1 and the target wireless access point based on the access related information.

In one embodiment, the first user equipment 1 includes various intelligent terminal devices capable of accessing a wireless network, for example, a smart phone, a tablet computer, a wearable device, and the like. The wireless network includes, but is not limited to, wireless local area networks (WLAN) based on IEEE 802.11 series standard protocols, for example, a wireless local area network (WLAN) based on the IEEE 802.11b protocol, that is, so-called WiFi (wireless fidelity) network. The wireless access point is an access point of the corresponding wireless network. The first user equipment 1 can access the corresponding wireless network through the wireless access point. The target wireless access point includes a wireless access point selected from one or more wireless access points. The access related information may include identification information and access verification information about the corresponding target wireless access point. The identification information may include SSID (Service Set Identifier) information. The SSID information is used for identifying the wireless network corresponding to the target wireless access point. The access verification information includes access point connection password information. The access related information may further include description file information including the identification information and the access verification information. In an actual application, to access the wireless network corresponding to the wireless access point, the first user equipment 1 generally needs to have a connection password matching the wireless access point or other verification information. The QR code information includes code information that records data symbol information by using particular black and white geometric figures distributed on a plane according to a certain rule. In the present application, In one embodiment, the QR code information correspondingly records the access related information about the corresponding wireless access point. Here, the first means 101 parses the target QR code information to obtain the access related information about the target wireless access point. Here, the parsing method includes reading binary data corresponding to the geometric figures in the QR code information based on an operation such as scan or touch&hold performed by the corresponding user. The information that is read may be target QR code information presented in another user equipment, or may be target QR code information that has been acquired by the first user equipment 1 and is presented in the first user equipment 1. Then, a decoding module preset in the first user equipment 1 is used to decode the read binary data according to various code systems such as a QR (Quick Response) code, so as to obtain the access related information about the target wireless access point that is represented by the QR code information. Here, In one embodiment, the decoding module may be loaded in a related application.

Here, the manner in which the first user equipment 1 acquires the target QR code information includes, but is not limited to: directly scanning and reading the QR code information on the second user equipment 2 (shown in FIG. 3), receiving the QR code information that is actively pushed from a corresponding network device or the second user equipment 2, or sending a QR code request to the corresponding network device or the second user equipment 2 and receiving QR code information returned from the opposite end. For example, In one embodiment, a fourth means of the second user equipment 2 (shown in FIG. 3) generates QR code information regarding a wireless access point based on access related information about the wireless access point. The second user equipment 2 may have acquired access related information about one or more wireless access points, or even corresponding access point associated information, from a corresponding cloud server based on its need to connect to a wireless access point. In this case, the wireless access point corresponding to the access related information stored in the second user equipment 2 may match its current location information, or may match location information about a historical connection. Here, the second user equipment 2 can periodically store access related information about a batch of current wireless access points that are reusable and have a high connection success rate. Here, the access related information may be stored directly in the form of QR code information, or QR code information loaded with access related information may be generated temporarily when the first user equipment 1 sends a request.

Those skilled in the art should understand that the parsing methods are merely exemplary, and other existing parsing methods or parsing methods that may appear in the future should also be included in the scope of protection of the present invention as applicable to the present invention and are hereby incorporated by reference.

Then, the second means 102 establishes a wireless connection between the first user equipment 1 and the target wireless access point based on the access related information. Here, if the target wireless access point is a wireless access point that can be accessed only with the access password or other access verification information, the first user equipment 1 establishes a wireless connection with the corresponding wireless access point based on the access related information parsed out from the QR code information. For example, the first user equipment 1 may actively search for a corresponding target wireless access point based on the access related information, and request to establish a wireless connection with the target wireless access point. For example, based on the access related information that includes the identification information such as the SSID information about the target wireless access point, the first user equipment 1 sends a detection request frame, actively detects the corresponding target wireless access point, and then establishes a wireless connection between the first user equipment 1 and the target wireless access point based on the access verification information about the target wireless access point. For another example, based on the access related information and with reference to wireless access point list information that has been detected, the first user equipment 1 may automatically determine to trigger the sending of a wireless connection establishment request to the target wireless access point. For another example, the first user equipment 1 may notify the corresponding user after determining the access related information about the target wireless access point, and establishes the wireless connection based on an operation instruction of the user.

To sum up, the present application parses the target QR code information regarding the target wireless access point to obtain the access related information about the target wireless access point, and establishes a wireless connection with the wireless access point, so that even if a corresponding user does not know the access related information about the target wireless access point or the first user equipment 1 may not successfully obtain the access related information from a corresponding server, the first user equipment 1 can quickly obtain access related information about a desirable target wireless access point, thereby meeting the wireless connection requirement of the first user equipment 1. In addition, the present application does not require the first user equipment 1 to select a wireless access point from a long wireless access point list displayed thereon and acquire the corresponding access related information, but instead, directly implements a wireless connection based on the access related information corresponding to the target wireless access point, thereby simplify corresponding operations and optimizing user experience. Here, the target wireless access point may be a wireless access point that another user equipment has successfully connected to or may be a wireless access point having a high connection success rate, so that the success rate of wireless connection of the first user equipment 1 based on the target wireless access point can be ensured.

The first means 101 of the first user equipment 1 acquires, by scanning the target QR code information presented on the second user equipment 2, the access related information about the target wireless access point corresponding to the target QR code information.

In one embodiment, the first user equipment 1 includes various intelligent terminal devices capable of accessing a wireless network, for example, a smart phone, a tablet computer, a wearable device, and the like. Here, In one embodiment, the first user equipment 1 is an intelligent terminal device having a scan function, for example, equipped with a photography apparatus, or an intelligent terminal device capable of implementing the scan function by means of a third-party device. Correspondingly, the second user equipment 2 (shown in FIG. 3) includes various intelligent terminal devices capable of accessing a wireless network, for example, a smart phone, a tablet computer, a wearable device, and the like. In this case, In one embodiment, the first user equipment 1 is closely neighbouring to the second user equipment 2, that is, the user of the first user equipment 1 can operate the first user equipment 1 to scan the target QR code information presented on a display interface of the second user equipment 2. Here, the second user equipment 2 provides the target QR code information to the first user equipment 1. For example, the target QR code information is presented on the display interface of the second user equipment 2. In one embodiment, the second user equipment 2 may further present a plurality of pieces of QR code information on the display interface, each piece of QR code information corresponding to access related information about one wireless access point, so that the user of the first user equipment 1 can determine the target QR code information in the plurality of pieces of QR code information, and acquire, by scanning the determined target QR code information using the first user equipment 1, the access related information about the target wireless access point corresponding to the target QR code information. Here, further, In one embodiment, the plurality of pieces of QR code information presented in the second user equipment 2 may correspondingly match the corresponding access point associated information. The access point associated information includes, but is not limited to, access point signal strength information, connection speed information, access point location information, and the like. Therefore, with reference to the access point associated information presented in the second user equipment 2, the corresponding user of the first user equipment 1 can select the target QR code information from the plurality of pieces of QR code information.

Here, the target QR code information presented in the second user equipment 2, or the plurality of pieces of QR code information presented in the embodiment, may be QR code information corresponding to a wireless access point that the second user equipment 2 is currently connecting to or has previously connected to, or may be QR code information corresponding to a wireless access point which is acquired and determined as having a high connection success rate by the second user equipment 2 although the second user equipment has never connected to it.

In this embodiment, In one embodiment, the wireless access point corresponding to the QR code information presented in the second user equipment 2 exists in a wireless access point list corresponding to the current location of the second user equipment 2. In addition, because the locations of the first user equipment 1 and the second user equipment 2 are closely neighbouring to each other, it can be determined that a wireless access point list that can be detected by the second user equipment 2 and a wireless access point list that can be acquired by the first user equipment 1 are basically the same, or most of wireless access points in the two lists are the same. Therefore, there is a high probability that the target wireless access point also covers the first user equipment 1. Further, in an actual application, because the locations of the first user equipment 1 and the second user equipment 2 are closely neighbouring to each other, the user of the first user equipment 1 may directly determine QR code information corresponding to a wireless access point that exists in the list detected by the first user equipment 1 and is also stored in the second user equipment 2.

Here, in the present application, the first user equipment 1 can acquire, by scanning the target QR code, the access related information about the corresponding target wireless access point in the second user equipment 2, for example, connection password information. In this way, if the first user equipment 1 may not successfully connect to the target wireless access point due to factors such as different wireless network connection statuses and differences between user equipments, the first user equipment can directly acquire the access related information about the target wireless access point from the neighbouring second user equipment 2. In addition, because acquiring the access related information by scanning the QR code does not need to consume traffic resources of the first user equipment 1, traffic resources of the first user equipment 1 can be saved.

Figure 2:
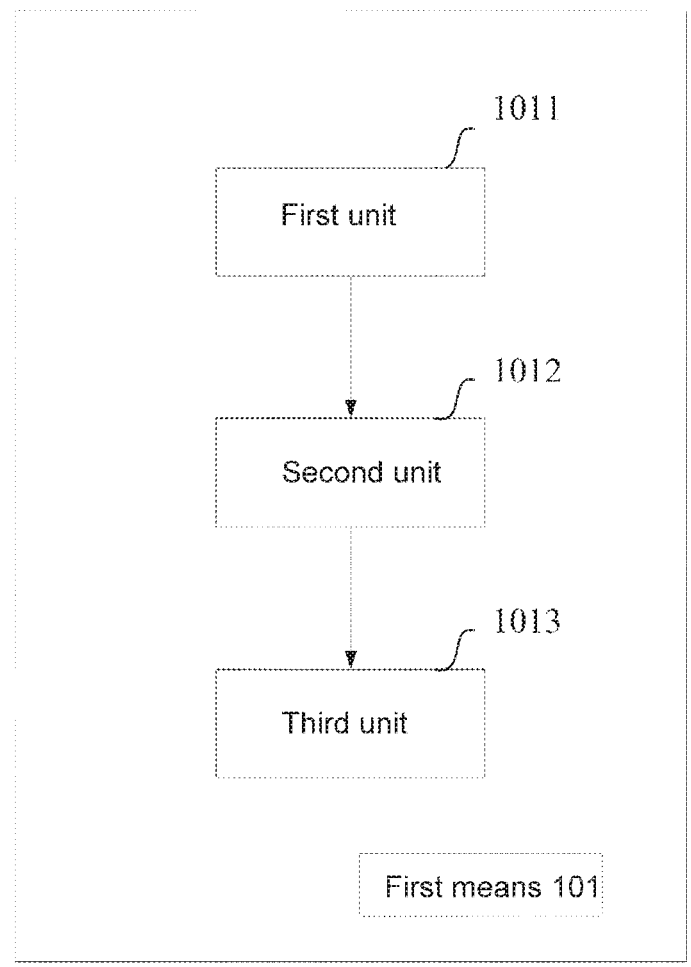
FIG. 2 shows a schematic diagram of a first means of a first user equipment for establishing a wireless connection according to an embodiment of the present application.

FIG. 2 is a schematic diagram of a first means 101 of a first user equipment 1 for establishing a wireless connection according to an embodiment of the present application. The first means 101 includes a first unit 1011, a second unit 1012, and a third unit 1013.

The first unit 1011 acquires one or more pieces of QR code information regarding wireless access points; the second unit 1012 determines, from the one or more pieces of QR code information, target QR code information regarding a target wireless access point; and the third unit 1013 parses the target QR code information to obtain access related information about the target wireless access point.

In one embodiment, in an actual application, the first user equipment 1 and another user equipment providing the target wireless access point may not be closely neighbouring to each other but are spaced apart from each other by a small distance and are both within the coverage area of one or more wireless access points; or currently the first user equipment 1 and another user equipment such as the second user equipment 2 are not within the coverage area of the target wireless access point at the same time, but because the second user equipment 2 stores the access related information corresponding to the target wireless access point and the location of the target wireless access point matches the current location of the first user equipment 1, the first user equipment 1 can acquire the QR code information corresponding to the target wireless access point from the second user equipment 2 and implement the corresponding wireless connection. Here, In one embodiment, picture information loaded with the QR code information may be generated in another user equipment corresponding to the first user equipment 1, so that the first user equipment 1 acquires the corresponding QR code information based on the picture information sent by the another user equipment. Here, the first user equipment 1 and the second user equipment 2 can implement data transmission based on various existing mobile communication networks or wireless local area networks (WLANs), or if the distance between the two equipments allows, can also implement the transmission of the picture information carrying the QR code information by means of NFC (Near Field Communication), screen information sharing or other manners.

Here, the first unit 1011 acquires one or more pieces of QR code information regarding wireless access points. For example, the first unit 1011 acquires the QR code information from the second user equipment 2. In this case, the second user equipment 2 may have a plurality of wireless access points matching the first user equipment 1, so that the first user equipment 1 may acquire QR code information regarding the matching wireless access points, for example, acquire picture information loaded with all the QR code information. Then, the second unit 1012 determines, from the one or more pieces of QR code information, target QR code information regarding a target wireless access point. Here, the first user equipment 1 may select currently optimal QR code information as the target QR code information regarding the target wireless access point based on an actual situation such as a requirement of a currently started application or information such as signal strength of the wireless access point that can be detected currently, and with reference to the access point associated information corresponding to all the acquired QR code information. Then, the third unit 1013 parses the target QR code information to obtain access related information about the target wireless access point, for example, parses the target QR code information automatically selected by the first user equipment 1 or the target QR code information included in the picture information loaded with the target QR code information chosen by the corresponding user, to obtain the access related information about the target wireless access point.

Here, the target QR code information regarding the target wireless access point may be attached to corresponding picture information, so that based on transmission of the picture information, the first user equipment can acquire the QR code information regarding the target wireless access point from another neighbouring user equipment or from another user equipment which is not neighbouring to the first user equipment but has the access related information about the target wireless access point that can match the first user equipment. Whereby, the first user equipment can acquire the target wireless access point having a high connection success rate from more other user equipments within a larger range and efficiently implement the corresponding wireless connection.

In one embodiment, the first unit 1011 acquires one or more pieces of QR code information regarding wireless access points from the second user equipment 2, where a distance between the second user equipment 2 and the first user equipment 1 is less than or equal to a predetermined distance threshold.

In one embodiment, In one embodiment, although sometimes the first user equipment 1 and the second user equipment 2 may not perform a face-to-face QR code information scan operation, the current locations of the two equipments currently may still be within the coverage area of one or more same wireless access points. In addition, the second user equipment 2 stores the QR code information corresponding to the access related information about at least one of the one or more same wireless access points. In one embodiment, the QR code information may be QR code information corresponding to a wireless access point that the second user equipment 2 is currently connecting to or has previously connected to, or may be QR code information corresponding to a wireless access point which is acquired based on the current location of the second user equipment 2 and determined as having a high connection success rate by the second user equipment although the second user equipment 2 has never connected to it. Here, the distance threshold is expected to achieve such an effect that when the distance between the first user equipment 1 and the second user equipment 2 is less than or equal to the predetermined distance threshold, there is at least one wireless access point capable of covering the two equipments at the same time, and the second user equipment 2 can have wireless access information about at least one of the wireless access points. Here, for setting of the distance threshold, the most appropriate distance threshold may be determined with reference to the distance between any two user equipments that can be covered by a same wireless access point within a certain range of the first user equipment, and based on analysis of historical statistics on the distance value. Alternatively, the distance threshold may be properly determined with reference to a coverage area of a common wireless access point.

In this embodiment, the geographical relationship between the first user equipment 1 and the second user equipment 2 providing the target QR code information thereto is extended from close neighbourhood to a certain range defined by the distance threshold, so that more user equipments can provide QR code information regarding available wireless access points to the first user equipment 1. In this way, the first user equipment 1 not only can acquire QR code information regarding available wireless access points from other closely neighbouring user equipments, but also has an opportunity to acquire QR code information regarding available wireless access points from more other user equipments within a wider range. In this case, because the first user equipment 1 and the second user equipment 2 may still be within the coverage area of the target wireless access point, their application environments are highly similar. Therefore, there is a high probability that the first user equipment 1 can successfully connect to the corresponding target wireless access point based on the target QR code information provided by the second user equipment 2, thereby more effectively helping the user of the first user equipment 1 to implement the wireless connection.

In one embodiment, the first unit 1011 sends a QR code information request regarding wireless access points, where the QR code information request includes the location information about the first user equipment 1; and acquires one or more pieces of QR code information regarding the wireless access points, and a wireless access point corresponding to the QR code information or a user equipment providing the QR code information matches the location information.

In one embodiment, in an actual application, the second user equipment 2 providing the QR code information to the first user equipment 1 can learn of the requirement of the first user equipment 1 in various manners. For example, when the first user equipment 1 and the second user equipment 2 are closely neighbouring to each other, the corresponding users of the two equipments may determine through direct communication that the first user equipment 1 is about to acquire the QR code information from the second user equipment 2. For another example, In one embodiment, the second user equipment 2 acquires a QR code information request regarding wireless access points that is sent by the first user equipment 1, where the QR code information request includes the location information about the first user equipment 1.

Here, the QR code information request regarding the wireless access points that is sent by the first unit 1011 may be sent to the determined second user equipment 2, or may be broadcast to a plurality of unknown second user equipments 2. Then, the first user equipment 1 acquires, based on the request, one or more pieces of QR code information regarding corresponding wireless access points that are fed back. Here, the wireless access point corresponding to the QR code information that is fed back may match the location information. For example, the second user equipment 2 receiving the request of the first user equipment 1 selects, for the first user equipment 1 based on the acquired location information about the first user equipment 1 and with reference to locally stored geographic location information corresponding to the wireless access points, a wireless access point which has the same location information as the first user equipment or is neighbouring to the first user equipment within a certain range. Further, the user equipment providing the QR code information matches the location information. For example, the distance between the current geographic location information about the user equipment providing the QR code information and the location information about the first user equipment 1 is less than the predetermined distance threshold. For another example, the user equipment providing the QR code information stores access related information corresponding to its own historical geographic location information, and the historical geographic location information matches the location information about the first user equipment 1. Here, In one embodiment, a specific application scenario of the present application is that: the first user equipment 1 and other user equipments providing the QR code information are all loaded with a same application, and can choose to publish their respective information such as current or historical geographic location information on an interaction platform corresponding to the application, and the user equipments can send a request to each other and obtain data transmitted by other user equipments. Here, In one embodiment, the first user equipment 1 may acquire the QR code information from one of the other user equipments, or may acquire the QR code information from a plurality of other user equipments.

In this embodiment, the relationship between the first user equipment 1 and the second user equipment 2 providing the target QR code information thereto is further extended, and is neither limited to close neighbourhood nor limited to the distance threshold. Instead, the first user equipment can acquire QR code information regarding available wireless access points from more other user equipments within a wide range. Here, the request sent by the first user equipment 1 includes the current location information about the first user equipment, and one or more pieces of QR code information regarding wireless access points satisfying the condition can be accurately determined based on the location information.

In an embodiment, the QR code information is attached to corresponding picture information, and the second unit 1012 presents, on a display interface of the first user equipment 1, corresponding picture information to which the one or more pieces of QR code information are attached; and determines, from the one or more pieces of QR code information based on the picture information, the target QR code information regarding the target wireless access point.

In one embodiment, the QR code information may include code information that records data symbol information by using particular black and white geometric figures distributed on a plane according to a certain rule. Its representation form includes alternating black and white graphical signs distributed on a plane. Here, to facilitate the transmission of the QR code information between different user equipments, the QR code information may be loaded in corresponding picture information, so that the first user equipment 1 directly acquires the picture information loaded with the QR code information from the user equipment providing the QR code information. Then, the first user equipment 1 presents the picture information on its display interface. The first user equipment may directly present QR code information regarding the picture information on the display interface, that is, present graphical signs of the QR code information on the display interface, or may present only an information list corresponding to the picture information on the display interface. Then, picture information is determined in the one or more pieces of picture information, and QR code information corresponding to the picture information is the target QR code information regarding the determined target wireless access point.

Here, the target QR code information regarding the target wireless access point may be attached to corresponding picture information, so that based on transmission of the picture information, the first user equipment can acquire the QR code information regarding the target wireless access point from another neighbouring user equipment or from another user equipment which is not neighbouring to the first user equipment but has the access related information about the target wireless access point that can match the first user equipment. Whereby, the first user equipment can acquire the target wireless access point having a high connection success rate from more other user equipments within a larger range and efficiently implement the corresponding wireless connection.

In one embodiment, the picture information further includes access point associated information corresponding to the wireless access point; and the second unit 1012 presents, on the display interface of the first user equipment, corresponding picture information to which the one or more pieces of QR code information are attached; and determines, from the one or more pieces of QR code information based on the access point associated information corresponding to the picture information, the target QR code information regarding the target wireless access point.

In one embodiment, the access point associated information may include access point signal strength information, connection speed information, access point homing information, access point coverage area information, access point location information, the location information about the user equipment providing the QR code information regarding the wireless access point, and the like. Therefore, with reference to the access point associated information presented in the second user equipment 2, the corresponding user of the first user equipment 1 can select the target QR code information from the plurality of pieces of QR code information. For example, the first user equipment 1 selects QR code information corresponding to a wireless access point that has a high signal strength or high connection speed or is close to the first user equipment, thereby improving the success rate of wireless connection. For another example, in some particular application scenarios, the corresponding user wants to connect the first user equipment to some high-security wireless access points. In this case, the first user equipment 1 may determine a target wireless access point meeting the requirement according to the access point homing information and access point security information. Here, the access point associated information may be loaded on another region in the picture information other than the location of the QR code information; further some information in the access point associated information is loaded on a display region of the QR code information in the form of a visible picture. In this way, based on the corresponding access point associated information displayed in the picture information, the first user equipment 1 determines, from the one or more pieces of QR code information, target QR code information regarding a target wireless access point.

Those skilled in the art should understand that the foregoing access point associated information is merely exemplary, and other existing types of access point associated information or other types of access point associated information that may appear in the future should also be included in the scope of protection of the present invention as applicable to the present invention and are hereby incorporated by reference.

Here, in this embodiment, the access point associated information may be used as reference information, to help the first user equipment 1 to select the target QR code of the target wireless access point from the acquired plurality of pieces of QR code information. This further improves the success rate of wireless connection of the first user equipment 1, and can also meet some particular requirements of the first user equipment 1 on the target wireless access point, thereby optimizing user experience.

In one embodiment, the third unit 1013 parses the target QR code information based on a gesture operation performed by a corresponding user on the picture information, so as to obtain the access related information about the target wireless access point.

In one embodiment, the QR code information may include code information that records data symbol information by using particular black and white geometric figures distributed on a plane according to a certain rule. Its representation form includes alternating black and white graphical signs distributed on a plane. Here, the first user equipment 1 presents the picture information on its display interface. The first user equipment may directly present the QR code information regarding the picture information on the display interface, that is, present the graphical signs of the QR code information on the display interface, or may present only an information list corresponding to the picture information on the display interface. In this case, the picture information corresponding to the target QR code information may be selected by means of a self-defined gesture operation of the user such as, but not limited to, tap or touch&hold, so as to read binary data corresponding to the geometric figures of the QR code information in the picture. For example, the picture information is presented on the display interface, and the corresponding binary data is read based on a touch&hold operation performed by the corresponding user on the geometric figures of the QR code information included therein. Then, a decoding module preset in the first user equipment 1 is used to decode the read binary data, so as to obtain the access related information about the target wireless access point that is represented by the QR code information.

In an embodiment (referring to FIG. 1), the access related information includes any one of the following: the identification information and the access verification information about the target wireless access point; access address information for acquiring the identification information and the access verification information; description file information including the identification information and the access verification information; and access address information for acquiring the description file information.

In one embodiment, the access related information may include identification information and access verification information about the corresponding target wireless access point. The identification information may include SSID (Service Set Identifier) information about the target wireless access point, or equipment MAC (Media Access Control) address information, or both the SSID information and the MAC address information. The identification information is mainly used for identifying the wireless network corresponding to the target wireless access point. Here, different wireless access points correspond to different security strategies, that is, different wireless link authentication modes. The access verification information may include verification information corresponding to the wireless link authentication mode. For example, in a key authentication mode, the access verification information includes access point connection password information corresponding to the wireless access point.

Here, different types of first user equipments 1 call data in different manners. For example, the first user equipment 1 may have a limitation in calling data, for example, an equipment using a closed iOS system may not directly call the identification information and the access verification information about the target wireless access point, and needs to implement the corresponding operation by running corresponding description file information. Therefore, to meet the requirements of this type of first user equipment 1, the access related information further includes the description file information including the identification information and the access verification information.

Here, considering the limited amount of data information that the QR code information can record, or to reduce the volume of data included in the QR code information to accelerate data transmission, the access related information may include only the access address information about the identification information and the access verification information, or may include only the access address information for acquiring the description file information. Then, the QR code information is parsed to obtain the access address information, and further the address information is accessed to acquire the corresponding identification information and access verification information, or the description file information.

In the present application, the access related information that is the most needed during connection to a wireless access point is flexibly loaded in the corresponding QR code information in multiple forms, so that different types of first user equipments having different requirements can implement the final wireless connection by using the corresponding access related information that suits them the most.

In one embodiment, if the access related information includes the identification information and the access verification information about the target wireless access point, the second means 102 establishes, by using the identification information and the access verification information to invoke a system wireless connection module in the first user equipment, the wireless connection between the first user equipment 1 and the target wireless access point.

In one embodiment, the first user equipment 1 parses the target QR code information to obtain the identification information and the access verification information about the target wireless access point, and then the second means 102 uses the identification information and the access verification information to invoke the system wireless connection module in the first user equipment 1. In this case, the system wireless connection module includes, but is not limited to, a script file loaded in the first user equipment 1 for the corresponding user, an application SDK (Software Development Kit) invocation interface that is set, or the like, so as to establish the wireless connection between the first user equipment 1 and the target wireless access point.

More In one embodiment, the second means 102 generates corresponding description file information based on the identification information and the access verification information when invocation of the system wireless connection module is limited; and establishes the wireless connection between the first user equipment 1 and the target wireless access point by executing the description file information.

In one embodiment, in an actual application, sometimes the second user equipment 2 does not determine the type of the first user equipment 1 in advance or match target QR code information including corresponding available access related information. In this case, due to differences between equipments, the access related information acquired by the first user equipment 1 may not be used directly. For example, after the first user equipment 1 parses the target QR code information, the identification information and the access verification information about the target wireless access point are obtained. However, the first user equipment 1 has a limitation in calling data, for example, an equipment using a closed iOS system may not directly call the identification information and the access verification information about the target wireless access point, and needs to implement the corresponding operation by running corresponding description file information. Therefore, when invocation of the system wireless connection module is limited, the second means 102 may further generate corresponding description file information based on the acquired identification information and access verification information about the target wireless access point, and then, the first user equipment 1 executes the description file information, to successfully initiate establishment of a wireless connection with the target wireless access point.

In an embodiment (referring to FIG. 1), the first user equipment 1 further includes a third means (not shown), the third means detects whether the first user equipment 1 is within the coverage area of the target wireless access point; and when the first user equipment 1 is within the coverage area of the target wireless access point, the second means 102 establishes a wireless connection between the first user equipment 1 and the target wireless access point based on the access related information.

In one embodiment, to increase the success rate of connection of the first user equipment 1 to the target wireless access point, in an actual application, In one embodiment, it may be detected whether the first user equipment 1 is within the coverage area of the target wireless access point, after the access related information about the target wireless access point is obtained. If the first user equipment 1 is within the coverage area of the target wireless access point, the second means 102 further establishes the corresponding wireless connection based on the access related information; if the first user equipment 1 is not within the coverage area of the target wireless access point, it can be determined that even if the first user equipment 1 possesses the access related information about the target wireless access point, the first user equipment 1 may not establish the wireless connection before it may not detect the target wireless access point. In this case, the first user equipment gives up on the target wireless access point, and may determine another suitable target wireless access point based on the present application.

In one embodiment, the third means detects, according to a predetermined detection condition, whether the first user equipment 1 is within the coverage area of the target wireless access point, where the detection condition includes at least one of the following: if wireless access points scanned by the first user equipment 1 include the target access point, the first user equipment 1 being within the coverage area of the target wireless access point; if a distance between the first user equipment 1 and the target access point is less than or equal to a first distance threshold, the first user equipment being within the coverage area of the target wireless access point; and if the distance between the first user equipment 1 and the second user equipment 2 providing the target QR code information is less than or equal to a second distance threshold, the first user equipment 1 being within the coverage area of the target wireless access point.

In one embodiment, the detection condition may include: if the wireless access points scanned by the first user equipment 1 include the target access point, the first user equipment 1 is within the coverage area of the target wireless access point. Here, for example, the first user equipment 1 may obtain wireless access point list information near its current location based on its scan function. If the target wireless access point is also in the wireless access point list information, the first user equipment 1 is within the coverage area of the target wireless access point.

Here, the detection condition may further include: if the distance between the first user equipment 1 and the target access point is less than or equal to the first distance threshold, the first user equipment is within the coverage area of the target wireless access point. Here, if the access point associated information corresponding to the target access point acquired by the first user equipment 1 includes coverage area information about the target wireless access point, the coverage area information may be used as the first distance threshold. When the distance between the first user equipment 1 and the target access point is less than or equal to the first distance threshold, it is determined that the first user equipment 1 is within the coverage area of the target wireless access point. In addition, to enable the target wireless access point meeting the requirement that is determined based on the detection condition to have a higher connection success rate, a more accurate first distance threshold may further be determined based on the coverage area information about the target wireless access point and with reference to historical connection statuses of the wireless access point. In addition, if the target wireless access point does not have corresponding coverage area information, the first distance threshold may be determined with reference to general coverage area information about a same type of wireless access point. Here, the first distance threshold in the detection condition may vary flexibly with different target access points detected, and sometimes, a same first distance threshold may be set for a plurality of target wireless access points.

Here, the detection condition may further include: if the distance between the first user equipment 1 and the second user equipment 2 providing the target QR code information is less than or equal to the second distance threshold, the first user equipment 1 is within the coverage area of the target wireless access point. Here, the second distance threshold is expected to achieve such an effect that when the distance between the first user equipment 1 and the second user equipment 2 is less than or equal to the predetermined second distance threshold, the target wireless access point can cover the two equipments at the same time. Here, In one embodiment, the first user equipment 1 may determine the second distance threshold based on its location information and geographic location information about the corresponding second user equipment 2 and with reference to the coverage area information corresponding to the target wireless access point. Alternatively, for setting of the second distance threshold, the most appropriate second distance threshold may be determined with reference to the distance between any two user equipments that can be covered by a same wireless access point within a certain range of the first user equipment 1, and based on analysis of historical statistics on the distance value. Then, actual distance information between the first user equipment 1 and the corresponding second user equipment 2 is determined based on their respective geographic location information, and then compared with the second distance threshold for detection.

Those skilled in the art should understand that the predetermined detection conditions are merely exemplary, and other existing types of detection conditions or other types of detection conditions that may appear in the future should also be included in the scope of protection of the present invention as applicable to the present invention and are hereby incorporated by reference.

Figure 3:
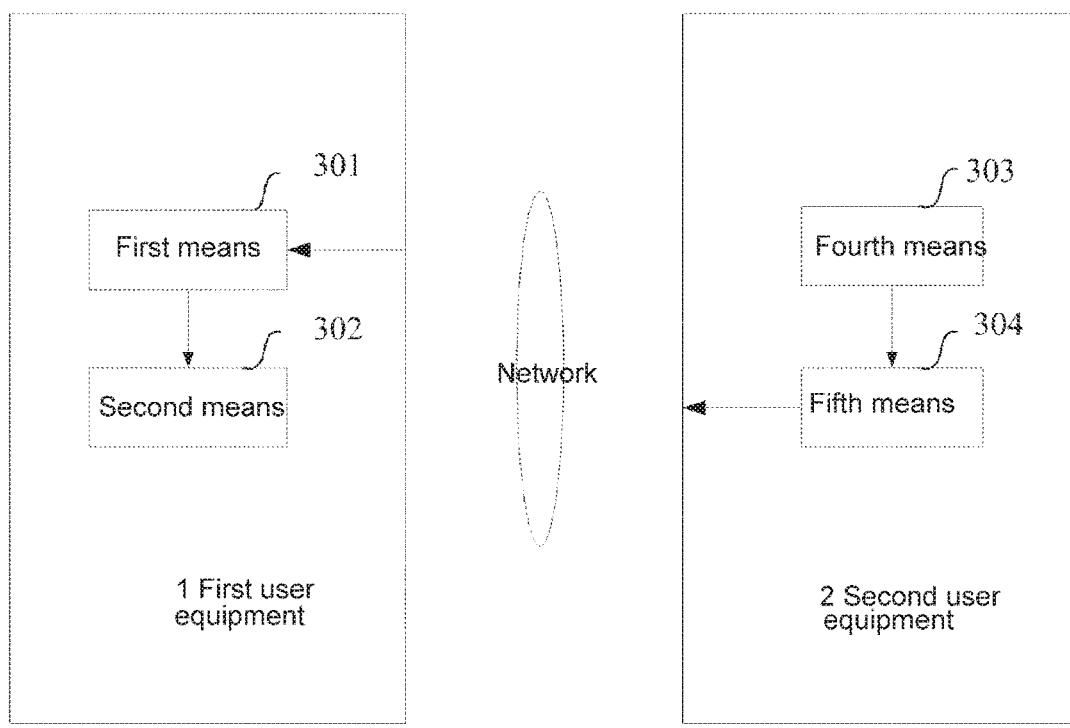
FIG. 3 shows a schematic diagram of a system including a first user equipment and second user equipment for establishing a wireless connection according to another embodiment of the present application.

FIG. 3 is a schematic diagram of a system including a first user equipment 1 and second user equipment 2 for establishing a wireless connection according to another embodiment of the present application. The first user equipment 1 includes a first means 301 and a second means 302. The second user equipment 2 includes a fourth means 303 and a fifth means 304.

The fourth means 303 of the second user equipment 2 generates QR code information regarding a wireless access point based on access related information about the wireless access point. The fifth means 304 of the second user equipment 2 presents the QR code information on a display interface. Then, the first means 301 of the first user equipment 1 acquires, by scanning the target QR code information presented on the second user equipment 2, the access related information about the target wireless access point corresponding to the target QR code information. Then, the second means 302 of the first user equipment 1 establishes a wireless connection between the first user equipment 1 and the target wireless access point based on the access related information. Here, the second means 302 in FIG. 3 is exactly or substantially the same as the second means 102 in FIG. 1, and therefore will not repeatedly described here, and is hereby incorporated by reference.

In one embodiment, the fourth means 303 of the second user equipment 2 generates QR code information regarding a wireless access point based on access related information about the wireless access point. The second user equipment 2 may have acquired access related information about one or more wireless access points, or even corresponding access point associated information, from a corresponding cloud server based on its need to connect to a wireless access point. In this case, the wireless access point corresponding to the access related information stored in the second user equipment 2 may match its current location information, or may match location information about a historical connection. Here, the second user equipment 2 can periodically store access related information about a batch of current wireless access points that are reusable and have a high connection success rate. Here, the access related information may be stored directly in the form of QR code information, or QR code information loaded with access related information may be generated temporarily when the first user equipment 1 sends a request.

Then, the fifth means 304 of the second user equipment 2 presents the QR code information on a display interface. Here, alternating black and white graphical signs are presented on the display interface of the second user equipment 2. The second user equipment 2 may choose to present one or more pieces of QR code information, for the corresponding first user equipment 1 to select. Based on the size of the display interface of the second user equipment 2, the one or more pieces of QR code information may be presented on the display interface at a time. In addition, access point associated information matching the wireless access point corresponding to the QR code information may further be displayed correspondingly. In this way, a reference basis can be provided for the first user equipment 1 to select the target QR code information.

Then, the first means 301 of the first user equipment 1 acquires, by scanning the target QR code information presented on the second user equipment 2, the access related information about the target wireless access point corresponding to the target QR code information. Here, the second user equipment 2 provides the target QR code information to the first user equipment 1. For example, the target QR code information is presented on the display interface of the second user equipment 2. In one embodiment, the second user equipment 2 may further present a plurality of pieces of QR code information on the display interface, each piece of QR code information corresponding to access related information about one wireless access point, so that the user of the first user equipment 1 can determine the target QR code information in the plurality of pieces of QR code information, and acquire, by scanning the determined target QR code information using the first user equipment 1, the access related information about the target wireless access point corresponding to the target QR code information. Here, further, In one embodiment, the plurality of pieces of QR code information presented in the second user equipment 2 may correspondingly match the corresponding access point associated information. The access point associated information includes, but is not limited to, access point signal strength information, connection speed information, access point location information, and the like. Therefore, with reference to the access point associated information presented in the second user equipment 2, the corresponding user of the first user equipment 1 can select the target QR code information from the plurality of pieces of QR code information.

Here, the second user equipment 2, when acquiring access related information about a wireless access point having a high connection success rate, can generate QR code information regarding the wireless access point based on the acquired access related information, and provide the QR code information to the first user equipment 1 that may also match the wireless access point, so that the first user equipment can implement the wireless connection based on the access related information corresponding to the determined target QR code information having a high connection success rate. Meanwhile, the access related information stored in the first user equipment is reused. Therefore, the overall resource utilization rate is improved.

In one embodiment, the fourth means 303 generates the QR code information regarding the wireless access point based on the access related information about the wireless access point; and attaches the QR code information to corresponding picture information, where the picture information further includes access point associated information corresponding to the wireless access point.

In one embodiment, the QR code information may include code information that records data symbol information by using particular black and white geometric figures distributed on a plane according to a certain rule. Its representation form includes alternating black and white graphical signs distributed on a plane. Here, to facilitate the transmission of the QR code information between different user equipments, the QR code information may be loaded in corresponding picture information, so that the first user equipment 1 directly acquires the picture information loaded with the QR code information from the second user equipment 2. Here, the picture information may further be loaded with access point associated information corresponding to the wireless access point. The access point associated information may include, but is not limited to, access point signal strength information, connection speed information, access point homing information, access point coverage area information, access point location information, the location information about the user equipment providing the QR code information regarding the wireless access point, and the like. Here, the access point associated information may be loaded on another region in the picture information other than the location of the QR code information; further some information in the access point associated information is loaded on a display region of the QR code information in the form of a visible picture. In this way, based on the corresponding access point associated information displayed in the picture information, the first user equipment 1 determines, from the one or more pieces of QR code information, target QR code information regarding a target wireless access point.

Here, the target QR code information regarding the target wireless access point may be attached to corresponding picture information, so that based on transmission of the picture information, the first user equipment 1 can conveniently acquire the QR code information regarding the target wireless access point from the second user equipment 2 without being limited to a face-to-face QR code scan. Whereby, the first user equipment 1 can be satisfied to acquire the target wireless access point having a high connection success rate from more of the second user equipment 2 within a larger range and efficiently meet the corresponding wireless connection demand.

Figure 4:
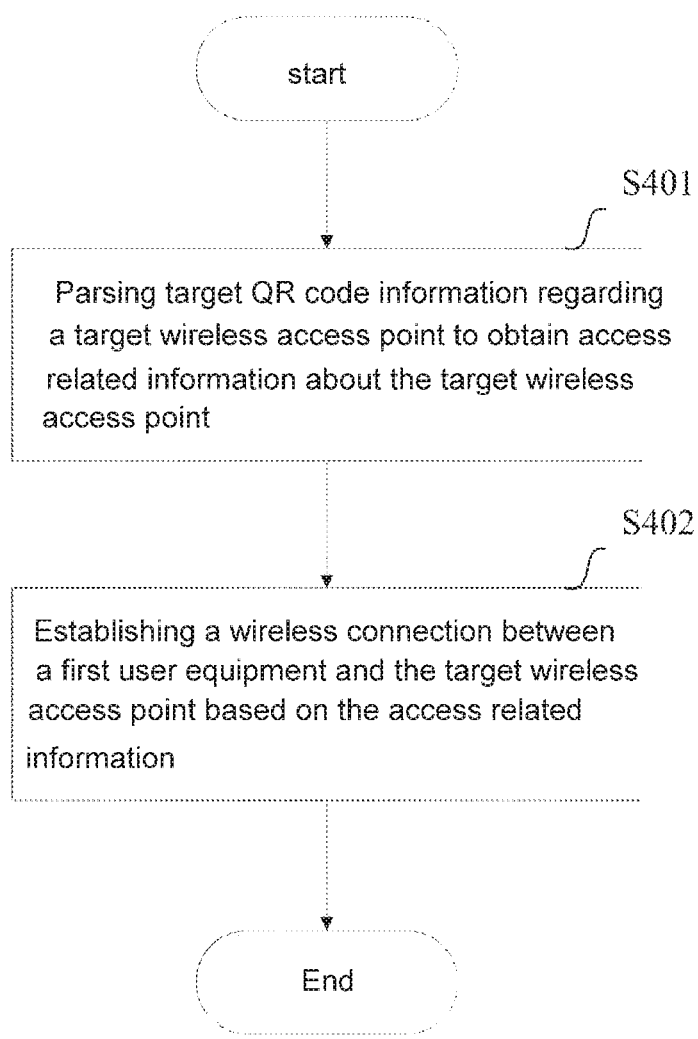
FIG. 4 shows a flowchart of a method for establishing a wireless connection at a first user equipment end according to another aspect of the present application.

FIG. 4 is a flowchart of a method for establishing a wireless connection at a first user equipment end according to another aspect of the present application. The method includes step S401, step S402, and step S403.

In step S401, the first user equipment 1 parses target QR code information regarding a target wireless access point to obtain access related information about the target wireless access point; and in step S401, the first user equipment 1 establishes a wireless connection between the first user equipment 1 and the target wireless access point based on the access related information.

In one embodiment, the first user equipment 1 includes various intelligent terminal devices capable of accessing a wireless network, for example, a smart phone, a tablet computer, a wearable device, and the like. The wireless network includes, but is not limited to, wireless local area networks (WLAN) based on IEEE 802.11 series standard protocols, for example, a wireless local area network (WLAN) based on the IEEE 802.11b protocol, that is, so-called WiFi (wireless fidelity) network. The wireless access point is an access point of the corresponding wireless network. The first user equipment 1 can access the corresponding wireless network through the wireless access point. The target wireless access point includes a wireless access point selected from one or more wireless access points. The access related information may include identification information and access verification information about the corresponding target wireless access point. The identification information may include SSID (Service Set Identifier) information. The SSID information is used for identifying the wireless network corresponding to the target wireless access point. The access verification information includes access point connection password information. The access related information may further include description file information including the identification information and the access verification information. In an actual application, to access the wireless network corresponding to the wireless access point, the first user equipment 1 generally needs to have a connection password matching the wireless access point or other verification information. The QR code information includes code information that records data symbol information by using particular black and white geometric figures distributed on a plane according to a certain rule. In the present application, In one embodiment, the QR code information correspondingly records the access related information about the corresponding wireless access point. Here, in step S401, the first user equipment 1 parses the target QR code information to obtain the access related information about the target wireless access point. Here, the parsing method includes reading binary data corresponding to the geometric figures in the QR code information based on an operation such as scan or touch & hold performed by the corresponding user. The information that is read may be target QR code information presented in another user equipment, or may be target QR code information that has been acquired by the first user equipment 1 and is presented in the first user equipment 1. Then, a decoding module preset in the first user equipment 1 is used to decode the read binary data according to various code systems such as a QR (Quick Response) code, so as to obtain the access related information about the target wireless access point that is represented by the QR code information. Here, In one embodiment, the decoding module may be loaded in a related application.

Here, the manner in which the first user equipment 1 acquires the target QR code information includes, but is not limited to: directly scanning and reading the QR code information on the second user equipment 2 (shown in FIG. 3), receiving the QR code information that is actively pushed from a corresponding network device or the second user equipment 2, or sending a QR code request to the corresponding network device or the second user equipment 2 and receiving QR code information returned from the opposite end. For example, In one embodiment, a fourth means of the second user equipment 2 (shown in FIG. 3) generates QR code information regarding a wireless access point based on access related information about the wireless access point. The second user equipment 2 may have acquired access related information about one or more wireless access points, or even corresponding access point associated information, from a corresponding cloud server based on its need to connect to a wireless access point. In this case, the wireless access point corresponding to the access related information stored in the second user equipment 2 may match its current location information, or may match location information about a historical connection. Here, the second user equipment 2 can periodically store access related information about a batch of current wireless access points that are reusable and have a high connection success rate. Here, the access related information may be stored directly in the form of QR code information, or QR code information loaded with access related information may be generated temporarily when the first user equipment 1 sends a request.

Those skilled in the art should understand that the parsing methods are merely exemplary, and other existing parsing methods or parsing methods that may appear in the future should also be included in the scope of protection of the present invention as applicable to the present invention and are hereby incorporated by reference.

Then, in step S402, the first user equipment 1 establishes a wireless connection between the first user equipment 1 and the target wireless access point based on the access related information. Here, if the target wireless access point is a wireless access point that can be accessed only with the access password or other access verification information, the first user equipment 1 establishes a wireless connection with the corresponding wireless access point based on the access related information parsed out from the QR code information. For example, the first user equipment 1 may actively search for a corresponding target wireless access point based on the access related information, and request to establish a wireless connection with the target wireless access point. For example, based on the access related information that includes the identification information such as the SSID information about the target wireless access point, the first user equipment 1 sends a detection request frame, actively detects the corresponding target wireless access point, and then establishes a wireless connection between the first user equipment 1 and the target wireless access point based on the access verification information about the target wireless access point. For another example, based on the access related information and with reference to wireless access point list information that has been detected, the first user equipment 1 may automatically determine to trigger the sending of a wireless connection establishment request to the target wireless access point. For another example, the first user equipment 1 may notify the corresponding user after determining the access related information about the target wireless access point, and establishes the wireless connection based on an operation instruction of the user.

To sum up, the present application parses the target QR code information regarding the target wireless access point to obtain the access related information about the target wireless access point, and establishes a wireless connection with the wireless access point, so that even if a corresponding user does not know the access related information about the target wireless access point or the first user equipment 1 may not successfully obtain the access related information from a corresponding server, the first user equipment 1 can quickly obtain access related information about a desirable target wireless access point, thereby meeting the wireless connection requirement of the first user equipment 1. In addition, the present application does not require the first user equipment 1 to select a wireless access point from a long wireless access point list displayed thereon and acquire the corresponding access related information, but instead, directly implements a wireless connection based on the access related information corresponding to the target wireless access point, thereby simplify corresponding operations and optimizing user experience. Here, the target wireless access point may be a wireless access point that another user equipment has successfully connected to or may be a wireless access point having a high connection success rate, so that the success rate of wireless connection of the first user equipment 1 based on the target wireless access point can be ensured.

In one embodiment, in step S401, the first user equipment 1 acquires, by scanning the target QR code information presented on the second user equipment 2, the access related information about the target wireless access point corresponding to the target QR code information.

In one embodiment, the first user equipment 1 includes various intelligent terminal devices capable of accessing a wireless network, for example, a smart phone, a tablet computer, a wearable device, and the like. Here, In one embodiment, the first user equipment 1 is an intelligent terminal device having a scan function, for example, equipped with a photography apparatus, or an intelligent terminal device capable of implementing the scan function by means of a third-party device. Correspondingly, the second user equipment 2 (shown in FIG. 3) includes various intelligent terminal devices capable of accessing a wireless network, for example, a smart phone, a tablet computer, a wearable device, and the like. In this case, In one embodiment, the first user equipment 1 is closely neighbouring to the second user equipment 2, that is, the user of the first user equipment 1 can operate the first user equipment 1 to scan the target QR code information presented on a display interface of the second user equipment 2. Here, the second user equipment 2 provides the target QR code information to the first user equipment 1. For example, the target QR code information is presented on the display interface of the second user equipment 2. In one embodiment, the second user equipment 2 may further present a plurality of pieces of QR code information on the display interface, each piece of QR code information corresponding to access related information about one wireless access point, so that the user of the first user equipment 1 can determine the target QR code information in the plurality of pieces of QR code information, and acquire, by scanning the determined target QR code information using the first user equipment 1, the access related information about the target wireless access point corresponding to the target QR code information. Here, further, In one embodiment, the plurality of pieces of QR code information presented in the second user equipment 2 may correspondingly match the corresponding access point associated information. The access point associated information includes, but is not limited to, access point signal strength information, connection speed information, access point location information, and the like. Therefore, with reference to the access point associated information presented in the second user equipment 2, the corresponding user of the first user equipment 1 can select the target QR code information from the plurality of pieces of QR code information.

Here, the target QR code information presented in the second user equipment 2, or the plurality of pieces of QR code information presented in the embodiment, may be QR code information corresponding to a wireless access point that the second user equipment 2 is currently connecting to or has previously connected to, or may be QR code information corresponding to a wireless access point which is acquired and determined as having a high connection success rate by the second user equipment 2 although the second user equipment has never connected to it.

In this embodiment, In one embodiment, the wireless access point corresponding to the QR code information presented in the second user equipment 2 exists in a wireless access point list corresponding to the current location of the second user equipment 2. In addition, because the locations of the first user equipment 1 and the second user equipment 2 are closely neighbouring to each other, it can be determined that a wireless access point list that can be detected by the second user equipment 2 and a wireless access point list that can be acquired by the first user equipment 1 are basically the same, or most of wireless access points in the two lists are the same. Therefore, there is a high probability that the target wireless access point also covers the first user equipment 1. Further, in an actual application, because the locations of the first user equipment 1 and the second user equipment 2 are closely neighbouring to each other, the user of the first user equipment 1 may directly determine QR code information corresponding to a wireless access point that exists in the list detected by the first user equipment 1 and is also stored in the second user equipment 2.

Here, in the present application, the first user equipment 1 can acquire, by scanning the target QR code, the access related information about the corresponding target wireless access point in the second user equipment 2, for example, connection password information. In this way, if the first user equipment 1 may not successfully connect to the target wireless access point due to factors such as different wireless network connection statuses and differences between user equipments, the first user equipment can directly acquire the access related information about the target wireless access point from the neighbouring second user equipment 2. In addition, because acquiring the access related information by scanning the QR code does not need to consume traffic resources of the first user equipment 1, traffic resources of the first user equipment 1 can be saved.

Figure 5:
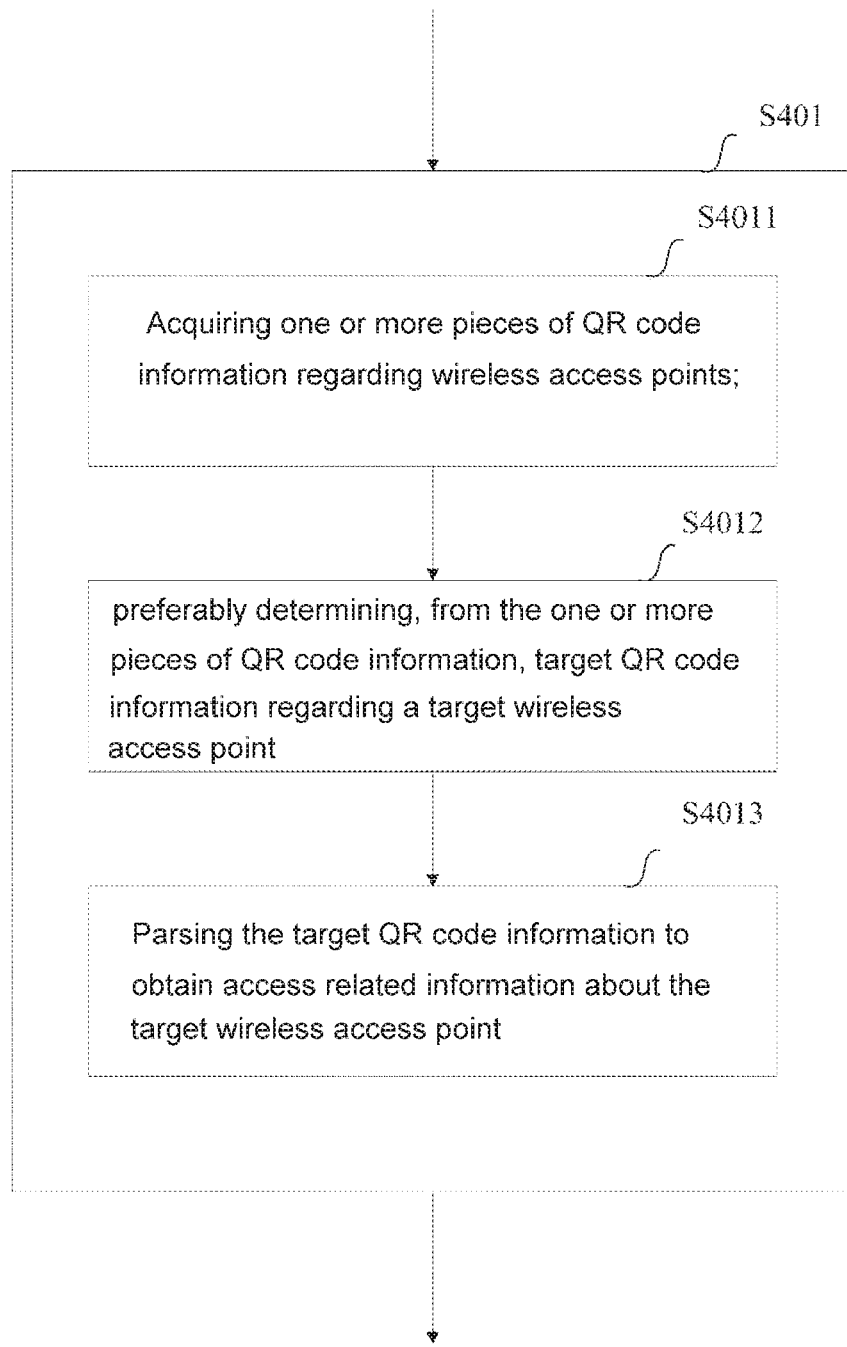
FIG. 5 shows a partial flowchart for establishing a wireless connection at a first user equipment end according to an embodiment of the present application.

FIG. 5 is a partial flowchart for establishing a wireless connection at a first user equipment end according to an embodiment of the present application. The step S401 includes step S4011, step S4012, and step S4013.

In step S4011, the first user equipment 1 acquires one or more pieces of QR code information regarding wireless access points; in step S4012, the first user equipment 1 determines, from the one or more pieces of QR code information, target QR code information regarding a target wireless access point; in step S4013, the first user equipment 1 parses the target QR code information to obtain access related information about the target wireless access point.

In one embodiment, in an actual application, the first user equipment 1 and another user equipment providing the target wireless access point may not be closely neighbouring to each other but are spaced apart from each other by a small distance and are both within the coverage area of one or more wireless access points; or currently the first user equipment 1 and another user equipment such as the second user equipment 2 are not within the coverage area of the target wireless access point at the same time, but because the second user equipment 2 stores the access related information corresponding to the target wireless access point and the location of the target wireless access point matches the current location of the first user equipment 1, the first user equipment 1 can acquire the QR code information corresponding to the target wireless access point from the second user equipment 2 and implement the corresponding wireless connection. Here, In one embodiment, picture information loaded with the QR code information may be generated in another user equipment corresponding to the first user equipment 1, so that the first user equipment 1 acquires the corresponding QR code information based on the picture information sent by the another user equipment. Here, the first user equipment 1 and the second user equipment 2 can implement data transmission based on various existing mobile communication networks or wireless local area networks (WLANs), or if the distance between the two equipments allows, can also implement the transmission of the picture information carrying the QR code information by means of NFC (Near Field Communication), screen information sharing or other manners.

Here, in step S4011, the first user equipment 1 acquires one or more pieces of QR code information regarding wireless access points. For example, the first user equipment 1 acquires the QR code information from the second user equipment 2. In this case, the second user equipment 2 may have a plurality of wireless access points matching the first user equipment 1, so that the first user equipment 1 may acquire QR code information regarding the matching wireless access points, for example, acquire picture information loaded with all the QR code information. Then, in step S4012, the first user equipment 1 determines, from the one or more pieces of QR code information, target QR code information regarding a target wireless access point. Here, the first user equipment 1 may select currently optimal QR code information as the target QR code information regarding the target wireless access point based on an actual situation such as a requirement of a currently started application or information such as signal strength of the wireless access point that can be detected currently, and with reference to the access point associated information corresponding to all the acquired QR code information. Then, in step S4013, the first user equipment 1 parses the target QR code information to obtain access related information about the target wireless access point, for example, parses the target QR code information automatically selected by the first user equipment 1 or the target QR code information included in the picture information loaded with the target QR code information chosen by the corresponding user, to obtain the access related information about the target wireless access point.

Here, the target QR code information regarding the target wireless access point may be attached to corresponding picture information, so that based on transmission of the picture information, the first user equipment can acquire the QR code information regarding the target wireless access point from another neighbouring user equipment or from another user equipment which is not neighbouring to the first user equipment but has the access related information about the target wireless access point that can match the first user equipment. Whereby, the first user equipment can acquire the target wireless access point having a high connection success rate from more other user equipments within a larger range and efficiently implement the corresponding wireless connection.

In one embodiment, in step S4011, the first user equipment 1 acquires one or more pieces of QR code information regarding wireless access points from the second user equipment 2, where a distance between the second user equipment 2 and the first user equipment 1 is less than or equal to a predetermined distance threshold.

In one embodiment, In one embodiment, although sometimes the first user equipment 1 and the second user equipment 2 may not perform a face-to-face QR code information scan operation, the current locations of the two equipments currently may still be within the coverage area of one or more same wireless access points. In addition, the second user equipment 2 stores the QR code information corresponding to the access related information about at least one of the one or more same wireless access points. In one embodiment, the QR code information may be QR code information corresponding to a wireless access point that the second user equipment 2 is currently connecting to or has previously connected to, or may be QR code information corresponding to a wireless access point which is acquired based on the current location of the second user equipment 2 and determined as having a high connection success rate by the second user equipment although the second user equipment 2 has never connected to it. Here, the distance threshold is expected to achieve such an effect that when the distance between the first user equipment 1 and the second user equipment 2 is less than or equal to the predetermined distance threshold, there is at least one wireless access point capable of covering the two equipments at the same time, and the second user equipment 2 can have wireless access information about at least one of the wireless access points. Here, for setting of the distance threshold, the most appropriate distance threshold may be determined with reference to the distance between any two user equipments that can be covered by a same wireless access point within a certain range of the first user equipment, and based on analysis of historical statistics on the distance value. Alternatively, the distance threshold may be properly determined with reference to a coverage area of a common wireless access point.

In this embodiment, the geographical relationship between the first user equipment 1 and the second user equipment 2 providing the target QR code information thereto is extended from close neighbourhood to a certain range defined by the distance threshold, so that more user equipments can provide QR code information regarding available wireless access points to the first user equipment 1. In this way, the first user equipment 1 not only can acquire QR code information regarding available wireless access points from other closely neighbouring user equipments, but also has an opportunity to acquire QR code information regarding available wireless access points from more other user equipments within a wider range. In this case, because the first user equipment 1 and the second user equipment 2 may still be within the coverage area of the target wireless access point, their application environments are highly similar. Therefore, there is a high probability that the first user equipment 1 can successfully connect to the corresponding target wireless access point based on the target QR code information provided by the second user equipment 2, thereby more effectively helping the user of the first user equipment 1 to implement the wireless connection.

In one embodiment, in step S4011, the first user equipment 1 sends a QR code information request regarding wireless access points, where the QR code information request includes the location information about the first user equipment 1; and acquires one or more pieces of QR code information regarding the wireless access points, where a wireless access point corresponding to the QR code information or a user equipment providing the QR code information matches the location information.

In one embodiment, in an actual application, the second user equipment 2 providing the QR code information to the first user equipment 1 can learn of the requirement of the first user equipment 1 in various manners. For example, when the first user equipment 1 and the second user equipment 2 are closely neighbouring to each other, the corresponding users of the two equipments may determine through direct communication that the first user equipment 1 is about to acquire the QR code information from the second user equipment 2. For another example, In one embodiment, the second user equipment 2 acquires a QR code information request regarding wireless access points that is sent by the first user equipment 1, where the QR code information request includes the location information about the first user equipment 1.

Here, in step S4011, the QR code information request regarding the wireless access points that is sent by the first user equipment 1 may be sent to the determined second user equipment 2, or may be broadcast to a plurality of unknown second user equipments 2. Then, the first user equipment 1 acquires, based on the request, one or more pieces of QR code information regarding corresponding wireless access points that are fed back. Here, the wireless access point corresponding to the QR code information that is fed back may match the location information. For example, the second user equipment 2 receiving the request of the first user equipment 1 selects, for the first user equipment 1 based on the acquired location information about the first user equipment 1 and with reference to locally stored geographic location information corresponding to the wireless access points, a wireless access point which has the same location information as the first user equipment or is neighbouring to the first user equipment within a certain range. Further, the user equipment providing the QR code information matches the location information. For example, the distance between the current geographic location information about the user equipment providing the QR code information and the location information about the first user equipment 1 is less than the predetermined distance threshold. For another example, the user equipment providing the QR code information stores access related information corresponding to its own historical geographic location information, and the historical geographic location information matches the location information about the first user equipment 1. Here, in one embodiment, a specific application scenario of the present application is that: the first user equipment 1 and other user equipments providing the QR code information are all loaded with a same application, and can choose to publish their respective information such as current or historical geographic location information on an interaction platform corresponding to the application, and the user equipments can send a request to each other and obtain data transmitted by other user equipments. Here, In one embodiment, the first user equipment 1 may acquire the QR code information from one of the other user equipments, or may acquire the QR code information from a plurality of other user equipments.

In this embodiment, the relationship between the first user equipment 1 and the second user equipment 2 providing the target QR code information thereto is further extended, and is neither limited to close neighbourhood nor limited to the distance threshold. Instead, the first user equipment 1 can acquire QR code information regarding available wireless access points from more other user equipments within a wide range. Here, the request sent by the first user equipment includes the current location information about the first user equipment, and one or more pieces of QR code information regarding wireless access points satisfying the condition can be accurately determined based on the location information.

In an embodiment, the QR code information is attached to corresponding picture information; and in step S4012, the first user equipment 1 presents, on a display interface of the first user equipment 1, corresponding picture information to which the one or more pieces of QR code information are attached; and determines, from the one or more pieces of QR code information based on the picture information, the target QR code information regarding the target wireless access point.

In one embodiment, the QR code information may include code information that records data symbol information by using particular black and white geometric figures distributed on a plane according to a certain rule. Its representation form includes alternating black and white graphical signs distributed on a plane. Here, to facilitate the transmission of the QR code information between different user equipments, the QR code information may be loaded in corresponding picture information, so that the first user equipment 1 directly acquires the picture information loaded with the QR code information from the user equipment providing the QR code information. Then, the first user equipment 1 presents the picture information on its display interface. The first user equipment may directly present QR code information regarding the picture information on the display interface, that is, present graphical signs of the QR code information on the display interface, or may present only an information list corresponding to the picture information on the display interface. Then, picture information is determined in the one or more pieces of picture information, and QR code information corresponding to the picture information is the target QR code information regarding the determined target wireless access point.

Here, the target QR code information regarding the target wireless access point may be attached to corresponding picture information, so that based on transmission of the picture information, the first user equipment can acquire the QR code information regarding the target wireless access point from another neighbouring user equipment or from another user equipment which is not neighbouring to the first user equipment but has the access related information about the target wireless access point that can match the first user equipment. Whereby, the first user equipment can acquire the target wireless access point having a high connection success rate from more other user equipments within a larger range and efficiently implement the corresponding wireless connection.

In one embodiment, the picture information further includes access point associated information corresponding to the wireless access point; and in step S4012, the first user equipment 1 presents, on the display interface of the first user equipment, the corresponding picture information to which the one or more pieces of QR code information are attached; and determines, from the one or more pieces of QR code information based on the access point associated information corresponding to the picture information, the target QR code information regarding the target wireless access point.

In one embodiment, the access point associated information may include access point signal strength information, connection speed information, access point homing information, access point coverage area information, access point location information, the location information about the user equipment providing the QR code information regarding the wireless access point, and the like. Therefore, with reference to the access point associated information presented in the second user equipment 2, the corresponding user of the first user equipment 1 can select the target QR code information from the plurality of pieces of QR code information. For example, the first user equipment 1 selects QR code information corresponding to a wireless access point that has a high signal strength or high connection speed or is close to the first user equipment, thereby improving the success rate of wireless connection. For another example, in some particular application scenarios, the corresponding user wants to connect the first user equipment 1 to some high-security wireless access points. In this case, the first user equipment may determine a target wireless access point meeting the requirement according to the access point homing information and access point security information. Here, the access point associated information may be loaded on another region in the picture information other than the location of the QR code information; further some information in the access point associated information is loaded on a display region of the QR code information in the form of a visible picture. In this way, based on the corresponding access point associated information displayed in the picture information, the first user equipment 1 determines, from the one or more pieces of QR code information, target QR code information regarding a the target wireless access point.

Those skilled in the art should understand that the foregoing access point associated information is merely exemplary, and other existing types of access point associated information or other types of access point associated information that may appear in the future should also be included in the scope of protection of the present invention as applicable to the present invention and are hereby incorporated by reference.

Here, in this embodiment, the access point associated information may be used as reference information, to help the first user equipment 1 to select the target QR code of the target wireless access point from the acquired plurality of pieces of QR code information. This further improves the success rate of wireless connection of the first user equipment 1, and can also meet some particular requirements of the first user equipment 1 on the target wireless access point, thereby optimizing user experience.

In one embodiment, in step S4013, the first user equipment 1 parses the target QR code information based on a gesture operation performed by a corresponding user on the picture information, so as to obtain the access related information about the target wireless access point.

In one embodiment, the QR code information may include code information that records data symbol information by using particular black and white geometric figures distributed on a plane according to a certain rule. Its representation form includes alternating black and white graphical signs distributed on a plane. Here, the first user equipment 1 presents the picture information on its display interface. The first user equipment may directly present the QR code information regarding the picture information on the display interface, that is, present the graphical signs of the QR code information on the display interface, or may present only an information list corresponding to the picture information on the display interface. In this case, the picture information corresponding to the target QR code information may be selected by means of a self-defined gesture operation of the user such as, but not limited to, tap or touch&hold, so as to read binary data corresponding to the geometric figures of the QR code information in the picture. For example, the picture information is presented on the display interface, and the corresponding binary data is read based on a touch&hold operation performed by the corresponding user on the geometric figures of the QR code information included therein. Then, a decoding module preset in the first user equipment 1 is used to decode the read binary data, so as to obtain the access related information about the target wireless access point that is represented by the QR code information.

In an embodiment (referring to FIG. 1), the access related information includes any one of the following: the identification information and the access verification information about the target wireless access point; access address information for acquiring the identification information and the access verification information; description file information including the identification information and the access verification information; and access address information for acquiring the description file information.

In one embodiment, the access related information may include identification information and access verification information about the corresponding target wireless access point. The identification information may include SSID (Service Set Identifier) information about the target wireless access point, or equipment MAC (Media Access Control) address information, or both the SSID information and the MAC address information. The identification information is mainly used for identifying the wireless network corresponding to the target wireless access point. Here, different wireless access points correspond to different security strategies, that is, different wireless link authentication modes. The access verification information may include verification information corresponding to the wireless link authentication mode. For example, in a key authentication mode, the access verification information includes access point connection password information corresponding to the wireless access point.

Here, different types of first user equipments 1 call data in different manners. For example, the first user equipment 1 may have a limitation in calling data, for example, an equipment using a closed iOS system may not directly call the identification information and the access verification information about the target wireless access point, and needs to implement the corresponding operation by running corresponding description file information. Therefore, to meet the requirements of this type of first user equipment 1, the access related information further includes the description file information including the identification information and the access verification information.

Here, considering the limited amount of data information that the QR code information can record, or to reduce the volume of data included in the QR code information to accelerate data transmission, the access related information may include only the access address information about the identification information and the access verification information, or may include only the access address information for acquiring the description file information. Then, the QR code information is parsed to obtain the access address information, and further the address information is accessed to acquire the corresponding identification information and access verification information, or the description file information.

In the present application, the access related information that is the most needed during connection to a wireless access point is flexibly loaded in the corresponding QR code information in multiple forms, so that different types of first user equipments having different requirements can implement the final wireless connection by using the corresponding access related information that suits them the most.

In one embodiment, if the access related information includes the identification information and the access verification information about the target wireless access point, in step S402, the first user equipment 1 establishes, by using the identification information and the access verification information to invoke a system wireless connection module in the first user equipment, the wireless connection between the first user equipment 1 and the target wireless access point.

In one embodiment, here, the first user equipment 1 parses the target QR code information to obtain the identification information and the access verification information about the target wireless access point, and then in step S402, the first user equipment 1 uses the identification information and the access verification information to invoke the system wireless connection module in the first user equipment 1. In this case, the system wireless connection module includes, but is not limited to, a script file loaded in the first user equipment 1 for the corresponding user, an application SDK (Software Development Kit) invocation interface that is set, or the like, so as to establish the wireless connection between the first user equipment 1 and the target wireless access point.

More In one embodiment, in step S402, the first user equipment 1 generates corresponding description file information based on the identification information and the access verification information when invocation of the system wireless connection module is limited; and establishes the wireless connection between the first user equipment 1 and the target wireless access point by executing the description file information.

In one embodiment, in an actual application, sometimes the second user equipment 2 does not determine the type of the first user equipment 1 in advance or match target QR code information including corresponding available access related information. In this case, due to differences between equipments, the access related information acquired by the first user equipment 1 may not be used directly. For example, after the first user equipment 1 parses the target QR code information, the identification information and the access verification information about the target wireless access point are obtained. However, the first user equipment 1 has a limitation in calling data, for example, an equipment using a closed iOS system may not directly call the identification information and the access verification information about the target wireless access point, and needs to implement the corresponding operation by running corresponding description file information. Therefore, when invocation of the system wireless connection module is limited, corresponding description file information may further be generated based on the acquired identification information and access verification information about the target wireless access point, and then, the first user equipment 1 executes the description file information, to successfully initiate establishment of a wireless connection with the target wireless access point.

In an embodiment (referring to FIG. 4), the method further includes step S403 (not shown). In step S403, the first user equipment 1 detect detects whether the first user equipment 1 is within the coverage area of the target wireless access point; in step S402, when the first user equipment 1 is within the coverage area of the target wireless access point, the first user equipment 1 establishes a wireless connection between the first user equipment 1 and the target wireless access point based on the access related information.

In one embodiment, to increase the success rate of connection of the first user equipment 1 to the target wireless access point, in an actual application, In one embodiment, it may be detected whether the first user equipment 1 is within the coverage area of the target wireless access point, after the access related information about the target wireless access point is obtained. If the first user equipment 1 is within the coverage area of the target wireless access point, further, in step S402, the first user equipment 1 establishes the corresponding wireless connection based on the access related information; if the first user equipment 1 is not within the coverage area of the target wireless access point, it can be determined that even if the first user equipment possesses the access related information about the target wireless access point, the first user equipment 1 may not establish the wireless connection before it may not detect the target wireless access point. In this case, the first user equipment 1 gives up on the target wireless access point, and may determine another suitable target wireless access point based on the present application.

In one embodiment, in step S403, the first user equipment 1 detects, according to a predetermined detection condition, whether the first user equipment 1 is within the coverage area of the target wireless access point, where the detection condition includes at least one of the following: if wireless access points scanned by the first user equipment 1 include the target access point, the first user equipment 1 being within the coverage area of the target wireless access point; if a distance between the first user equipment 1 and the target access point is less than or equal to a first distance threshold, the first user equipment being within the coverage area of the target wireless access point; and if the distance between the first user equipment 1 and the second user equipment 2 providing the target QR code information is less than or equal to a second distance threshold, the first user equipment 1 being within the coverage area of the target wireless access point.

In one embodiment, the detection condition may include: if the wireless access points scanned by the first user equipment 1 include the target access point, the first user equipment 1 is within the coverage area of the target wireless access point. Here, for example, the first user equipment 1 may obtain wireless access point list information near its current location based on its scan function. If the target wireless access point is also in the wireless access point list information, the first user equipment 1 is within the coverage area of the target wireless access point.

Here, the detection condition may further include: if the distance between the first user equipment 1 and the target access point is less than or equal to the first distance threshold, the first user equipment is within the coverage area of the target wireless access point. Here, if the access point associated information corresponding to the target access point acquired by the first user equipment 1 includes coverage area information about the target wireless access point, the coverage area information may be used as the first distance threshold. When the distance between the first user equipment 1 and the target access point is less than or equal to the first distance threshold, it is determined that the first user equipment 1 is within the coverage area of the target wireless access point. In addition, to enable the target wireless access point meeting the requirement that is determined based on the detection condition to have a higher connection success rate, a more accurate first distance threshold may further be determined based on the coverage area information about the target wireless access point and with reference to historical connection statuses of the wireless access point. In addition, if the target wireless access point does not have corresponding coverage area information, the first distance threshold may be determined with reference to general coverage area information about a same type of wireless access point. Here, the first distance threshold in the detection condition may vary flexibly with different target access points detected, and sometimes, a same first distance threshold may be set for a plurality of target wireless access points.

Here, the detection condition may further include: if the distance between the first user equipment 1 and the second user equipment 2 providing the target QR code information is less than or equal to the second distance threshold, the first user equipment 1 is within the coverage area of the target wireless access point. Here, the second distance threshold is expected to achieve such an effect that when the distance between the first user equipment 1 and the second user equipment 2 is less than or equal to the predetermined second distance threshold, the target wireless access point can cover the two equipments at the same time. Here, In one embodiment, the first user equipment 1 may determine the second distance threshold based on its location information and geographic location information about the corresponding second user equipment 2 and with reference to the coverage area information corresponding to the target wireless access point. Alternatively, for setting of the second distance threshold, the most appropriate second distance threshold may be determined with reference to the distance between any two user equipments that can be covered by a same wireless access point within a certain range of the first user equipment 1, and based on analysis of historical statistics on the distance value. Then, actual distance information between the first user equipment 1 and the corresponding second user equipment 2 is determined based on their respective geographic location information, and then compared with the second distance threshold for detection.

Those skilled in the art should understand that the predetermined detection conditions are merely exemplary, and other existing types of detection conditions or other types of detection conditions that may appear in the future should also be included in the scope of protection of the present invention as applicable to the present invention and are hereby incorporated by reference.

Figure 6:
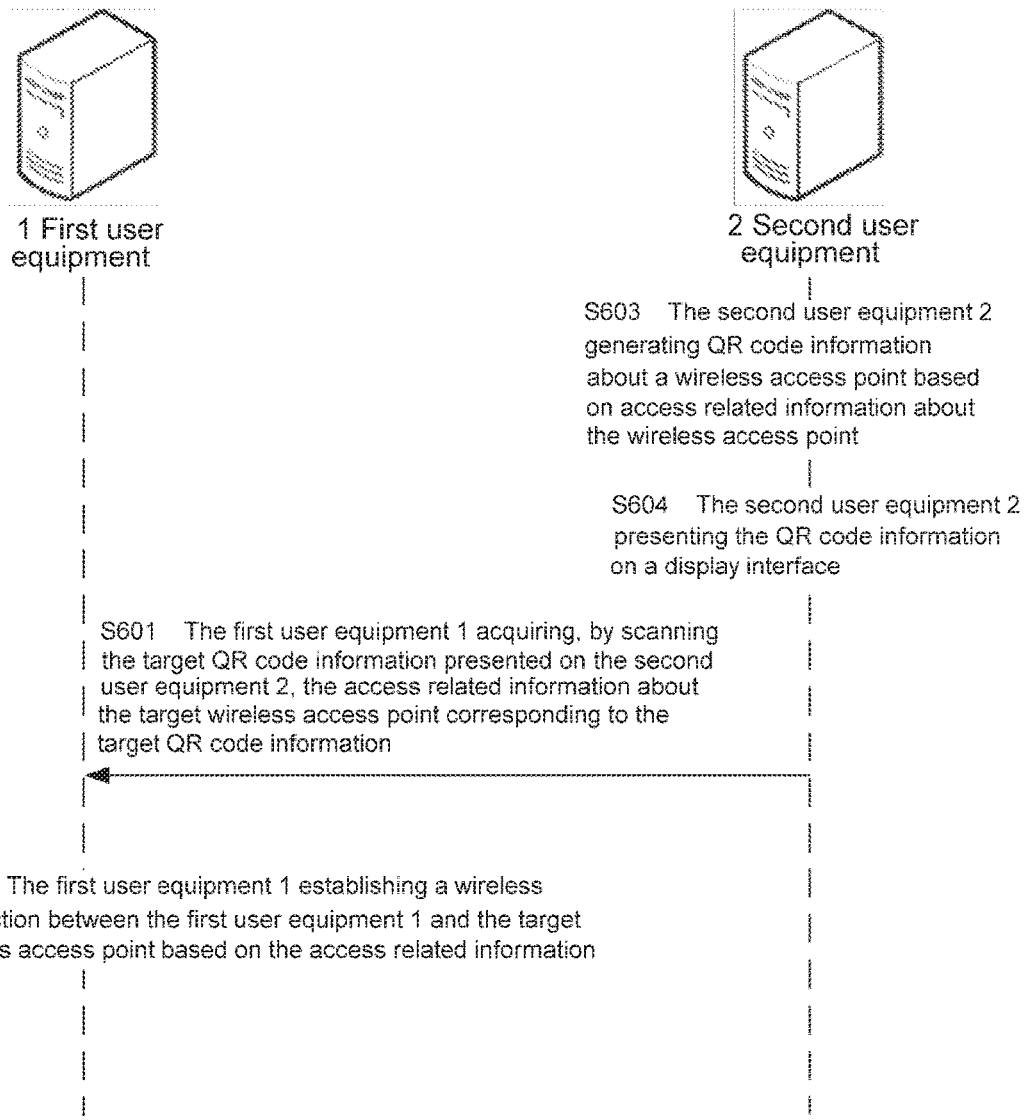
FIG. 6 shows a flowchart of a method for establishing a wireless connection at a first user equipment end and a second user equipment end according to another embodiment of the present application.

FIG. 6 is a flowchart of a method for establishing a wireless connection at a first user equipment end and a second user equipment end according to another embodiment of the present application. The method includes step S603, step S604, step S601, and step S602.

In step S603, the second user equipment 2 generates QR code information regarding a wireless access point based on access related information about the wireless access point. In step S604, the second user equipment 2 presents the QR code information on a display interface. Then, in step S601, the first user equipment 1 acquires, by scanning the target QR code information presented on the second user equipment 2, the access related information about the target wireless access point corresponding to the target QR code information. Then, in step S602, the first user equipment 1 establishes a wireless connection between the first user equipment 1 and the target wireless access point based on the access related information. Here, step S602 in FIG. 6 is exactly or substantially the same as step S402 in FIG. 4, and therefore will not repeatedly described here, and is hereby incorporated by reference.

In one embodiment, in step S603, the second user equipment 2 generates QR code information regarding a wireless access point based on access related information about the wireless access point. The second user equipment 2 may have acquired access related information about one or more wireless access points, or even corresponding access point associated information, from a corresponding cloud server based on its need to connect to a wireless access point. In this case, the wireless access point corresponding to the access related information stored in the second user equipment 2 may match its current location information, or may match location information about a historical connection. Here, the second user equipment 2 can periodically store access related information about a batch of current wireless access points that are reusable and have a high connection success rate. Here, the access related information may be stored directly in the form of QR code information, or QR code information loaded with access related information may be generated temporarily when the first user equipment 1 sends a request.

Then, in step S604, the second user equipment 2 presents the QR code information on a display interface. Here, alternating black and white graphical signs are presented on the display interface of the second user equipment 2. The second user equipment 2 may choose to present one or more pieces of QR code information, for the corresponding first user equipment 1 to select. Based on the size of the display interface of the second user equipment 2, the one or more pieces of QR code information may be presented on the display interface at a time. In addition, access point associated information matching the wireless access point corresponding to the QR code information may further be displayed correspondingly. In this way, a reference basis can be provided for the first user equipment 1 to select the target QR code information.

Then, in step S601, the first user equipment 1 acquires, by scanning the target QR code information presented on the second user equipment 2, the access related information about the target wireless access point corresponding to the target QR code information. Here, the second user equipment 2 provides the target QR code information to the first user equipment 1. For example, the target QR code information is presented on the display interface of the second user equipment 2. In one embodiment, the second user equipment 2 may further present a plurality of pieces of QR code information on the display interface, each piece of QR code information corresponding to access related information about one wireless access point, so that the user of the first user equipment 1 can determine the target QR code information in the plurality of pieces of QR code information, and acquire, by scanning the determined target QR code information using the first user equipment 1, the access related information about the target wireless access point corresponding to the target QR code information. Here, further, In one embodiment, the plurality of pieces of QR code information presented in the second user equipment 2 may correspondingly match the corresponding access point associated information. The access point associated information includes, but is not limited to, access point signal strength information, connection speed information, access point location information, and the like. Therefore, with reference to the access point associated information presented in the second user equipment 2, the corresponding user of the first user equipment 1 can select the target QR code information from the plurality of pieces of QR code information.

Further, the second user equipment 2, when acquiring access related information about a wireless access point having a high connection success rate, can generate QR code information regarding the wireless access point based on the acquired access related information, and provide the QR code information to the first user equipment 1 that may also match the wireless access point, so that the first user equipment can implement the wireless connection based on the access related information corresponding to the determined target QR code information having a high connection success rate. Meanwhile, the access related information stored in the first user equipment is reused, thereby improving the overall resource utilization rate.

In one embodiment, in step S603, the second user equipment 2 generates the QR code information regarding the wireless access point based on the access related information about the wireless access point; and attaches the QR code information to corresponding picture information, and the picture information further includes access point associated information corresponding to the wireless access point.

In one embodiment, the QR code information may include code information that records data symbol information by using particular black and white geometric figures distributed on a plane according to a certain rule. Its representation form includes alternating black and white graphical signs distributed on a plane. Here, to facilitate the transmission of the QR code information between different user equipments, the QR code information may be loaded in corresponding picture information, so that the first user equipment 1 directly acquires the picture information loaded with the QR code information from the second user equipment 2. Here, the picture information may further be loaded with access point associated information corresponding to the wireless access point. The access point associated information may include, but is not limited to, access point signal strength information, connection speed information, access point homing information, access point coverage area information, access point location information, the location information about the user equipment providing the QR code information regarding the wireless access point, and the like. Here, the access point associated information may be loaded on another region in the picture information other than the location of the QR code information; further, some information in the access point associated information is loaded on a display region of the QR code information in the form of a visible picture. In this way, based on the corresponding access point associated information displayed in the picture information, the first user equipment 1 determines, from the one or more pieces of QR code information, target QR code information regarding a target wireless access point.

Here, the target QR code information regarding the target wireless access point may be attached to corresponding picture information, so that based on transmission of the picture information, the first user equipment 1 can conveniently acquire the QR code information regarding the target wireless access point from the second user equipment 2 without being limited to a face-to-face QR code scan. Whereby, the first user equipment 1 can be satisfied to acquire the target wireless access point having a high connection success rate from more of the second user equipment 2 within a larger range and efficiently meet the corresponding wireless connection demand.

For those skilled in the art, it is apparent that the present application is not limited to the details of the above-mentioned exemplary embodiments, and the present application can be implemented in other specific forms without departing the spirit or basic features of the present application. Therefore, no matter from which point of view, the embodiments should all be regarded as exemplary and non-limiting. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the device claims may also be implemented by one unit or means by means of software or hardware. The terms first and second and the like are used to represent names and do not represent any particular order.

What is claimed is:

1. A method for establishing a wireless connection at a first user equipment, comprising:
broadcasting a wireless access point connection request to one or more second user equipments within a predetermined distance threshold;
receiving and parsing QR code information regarding one or more wireless access points returned by the one or more second user equipments to obtain access related information and access points associated information about the one or more wireless access points;
selecting a wireless access point from the one or more wireless access points as a target wireless access point based on the access point associated information about the one or more wireless access points; and
establishing a wireless connection between a first user equipment and the target wireless access point based on the access related information of the target wireless access point.

2. The method according to claim 1, wherein the step of receiving and parsing QR code information regarding the one or more wireless access points returned by the one or more second user equipments to obtain access related information and access points associated information about the one or more wireless access points comprises:
acquiring, by scanning QR code information presented on a second user equipment, the access related information about a wireless access point corresponding to the QR code information.

3. The method according to claim 1, wherein the step of receiving and parsing QR code information regarding the one or more wireless access points returned by the one or more second user equipments to obtain access related information and access points associated information about the one or more wireless access points comprises:
  acquiring one or more pieces of QR code information regarding the one or more wireless access points;
  determining, from the one or more pieces of QR code information, QR code information regarding the one or more wireless access points; and
  parsing the QR code information to obtain access related information and access points associated information about the one or more wireless access points.

4. The method according to claim 3, wherein
  the wireless access point connection request comprises location information about the first user equipment, and
  the one or more wireless access points corresponding to the QR code information returned by the one or more second user equipments or the one or more second user equipments returning the QR code information match the location information.

5. The method according to claim 3, wherein the QR code information is attached to corresponding picture information,
  wherein the step of determining, from the one or more pieces of QR code information, QR code information regarding the one or more wireless access points comprises:
    presenting, on a display interface of the first user equipment, corresponding picture information to which the one or more pieces of QR code information are attached; and
    determining, from the one or more pieces of QR code information based on the picture information, the QR code information regarding the one or more wireless access points.

6. The method according to claim 5, wherein the step of receiving and parsing the QR code information regarding the one or more wireless access points returned by the one or more second user equipments to obtain access related information and access points associated information about the one or more wireless access points comprises:
  parsing the QR code information based on a gesture operation performed by a corresponding user on the picture information, so as to obtain the access related information and access points associated information about the one or more wireless access points.

7. The method according to claim 1, wherein the access related information comprises any one of the following:
  identification information and access verification information of the one or more wireless access point;
  access address information for acquiring the identification information and the access verification information;
  description file information comprising the identification information and the access verification information; and
  access address information for acquiring the description file information.

8. The method according to claim 7, wherein if the access related information comprises the identification information and the access verification information of the one or more wireless access points,
  the step of establishing the wireless connection between the first user equipment and the target wireless access point based on the access related information of the target wireless access point comprises:
    establishing, by using the identification information and the access verification information to invoke a system wireless connection module in the first user equipment, the wireless connection between the first user equipment and the target wireless access point.

9. The method according to claim 8, wherein the step of establishing the wireless connection between the first user equipment and the target wireless access point based on the access related information of the target wireless access point comprises:
  generating corresponding description file information based on the identification information and the access verification information when invocation of the system wireless connection module is limited; and
  establishing the wireless connection between the first user equipment and the target wireless access point by executing the description file information.

10. The method according to claim 1, further comprising:
  detecting whether the first user equipment is within a coverage area of the target wireless access point,
  wherein the step of establishing a wireless connection between the first user equipment and the target wireless access point based on the access related information of the target wireless access point comprises:
    when the first user equipment is within the coverage area of the target wireless access point, establishing the wireless connection between the first user equipment and the target wireless access point based on the access related information of the target wireless access point.

11. The method according to claim 10, wherein the step of detecting whether the first user equipment is within the coverage area of the target wireless access point comprises:
  detecting, according to a predetermined detection condition, whether the first user equipment is within the coverage area of the target wireless access point,
  wherein the detection condition comprises at least one of the following:
    if wireless access points scanned by the first user equipment comprise the target access point, the first user equipment being within the coverage area of the target wireless access point;
    if a distance between the first user equipment and the target access point is less than or equal to a first distance threshold, the first user equipment being within the coverage area of the target wireless access point; and
    if the distance between the first user equipment and the second user equipment providing the target QR code information is less than or equal to a second distance threshold, the first user equipment being within the coverage area of the target wireless access point.

12. A system for establishing a wireless connection, comprising
  a first user equipment, comprising:
  a first means for
  broadcasting a wireless access point connection request to one or more second user equipments within a predetermined distance threshold,
  receiving and parsing QR code information regarding one or more wireless access points returned by the one or more second user equipments to obtain access related information and access point associated information about the one or more wireless access points, and
  selecting a wireless access point from the one or more wireless access points as a target wireless access point based on the access point associated information about the one or more wireless access points, and,
  a second means for establishing a wireless connection between the first user equipment and the target wireless access point based on the access related information of the target wireless access point; and one or more second user equipments, comprising:
a fourth means for generating QR code information about a wireless access point based on access related information and access point associated information about the wireless access point.

* * * * *